US010515063B1

(12) United States Patent
Burtsev et al.

(10) Patent No.: US 10,515,063 B1
(45) Date of Patent: Dec. 24, 2019

(54) SYSTEM AND METHOD FOR REAL-TIME DATA ACQUISITION AND DISPLAY

(71) Applicant: Chicago Board Options Exchange, Incorporated, Chicago, IL (US)

(72) Inventors: Andrei Burtsev, Moraga, CA (US); Vitaliy Gutarin, Odesa (UA); Oleksandr Bozhenko, Moraga, CA (US)

(73) Assignee: Cboe Exchange, Inc., Chicago, IL (US)

( * ) Notice: Subject to any disclaimer, the term of this patent is extended or adjusted under 35 U.S.C. 154(b) by 194 days.

(21) Appl. No.: 15/383,920

(22) Filed: Dec. 19, 2016

(51) Int. Cl.
| | |
|---|---|
| *G06F 17/00* | (2019.01) |
| *G06F 16/22* | (2019.01) |
| *G06F 16/248* | (2019.01) |
| *G06F 16/25* | (2019.01) |
| *G06F 16/23* | (2019.01) |
| *G06F 16/2455* | (2019.01) |

(52) U.S. Cl.
CPC ...... *G06F 16/2246* (2019.01); *G06F 16/2358* (2019.01); *G06F 16/248* (2019.01); *G06F 16/2455* (2019.01); *G06F 16/252* (2019.01)

(58) Field of Classification Search
None
See application file for complete search history.

(56) References Cited

U.S. PATENT DOCUMENTS

| | | | | |
|---|---|---|---|---|
| 5,875,296 | A  * | 2/1999 | Shi | G06F 21/41 726/5 |
| 8,892,687 | B1 * | 11/2014 | Call | H04L 29/06972 709/217 |
| 2013/0019000 | A1 * | 1/2013 | Markus | G06F 9/466 709/223 |
| 2013/0339293 | A1 * | 12/2013 | Witten | G06F 17/30067 707/609 |
| 2014/0236781 | A1 * | 8/2014 | Bestfleisch | G06Q 40/12 705/30 |
| 2016/0004737 | A1 * | 1/2016 | Mehta | G06F 16/144 707/741 |
| 2016/0350226 | A1 * | 12/2016 | Agarwal | G06F 12/0813 |
| 2017/0208073 | A1 * | 7/2017 | Eleish | G06F 17/30256 |
| 2018/0081767 | A1 * | 3/2018 | He | G06F 11/1471 |

* cited by examiner

*Primary Examiner* — Hung D Le
(74) *Attorney, Agent, or Firm* — Brinks Gilson & Lione

(57) ABSTRACT

An apparatus includes a processor and a non-transitory computer-readable medium storing instructions that, when executed by the processor, cause the processor to perform operations including receiving a request for object identifiers, the request associated with a unique session, sending an object identifier, the object identifier associated with an object from a list of objects each having a corresponding object identifier, receiving a request for data, the request referencing the object identifier and a data value associated with the object, performing an in-memory retrieval for the data value associated with the object identifier, and transmitting the data value.

17 Claims, 10 Drawing Sheets

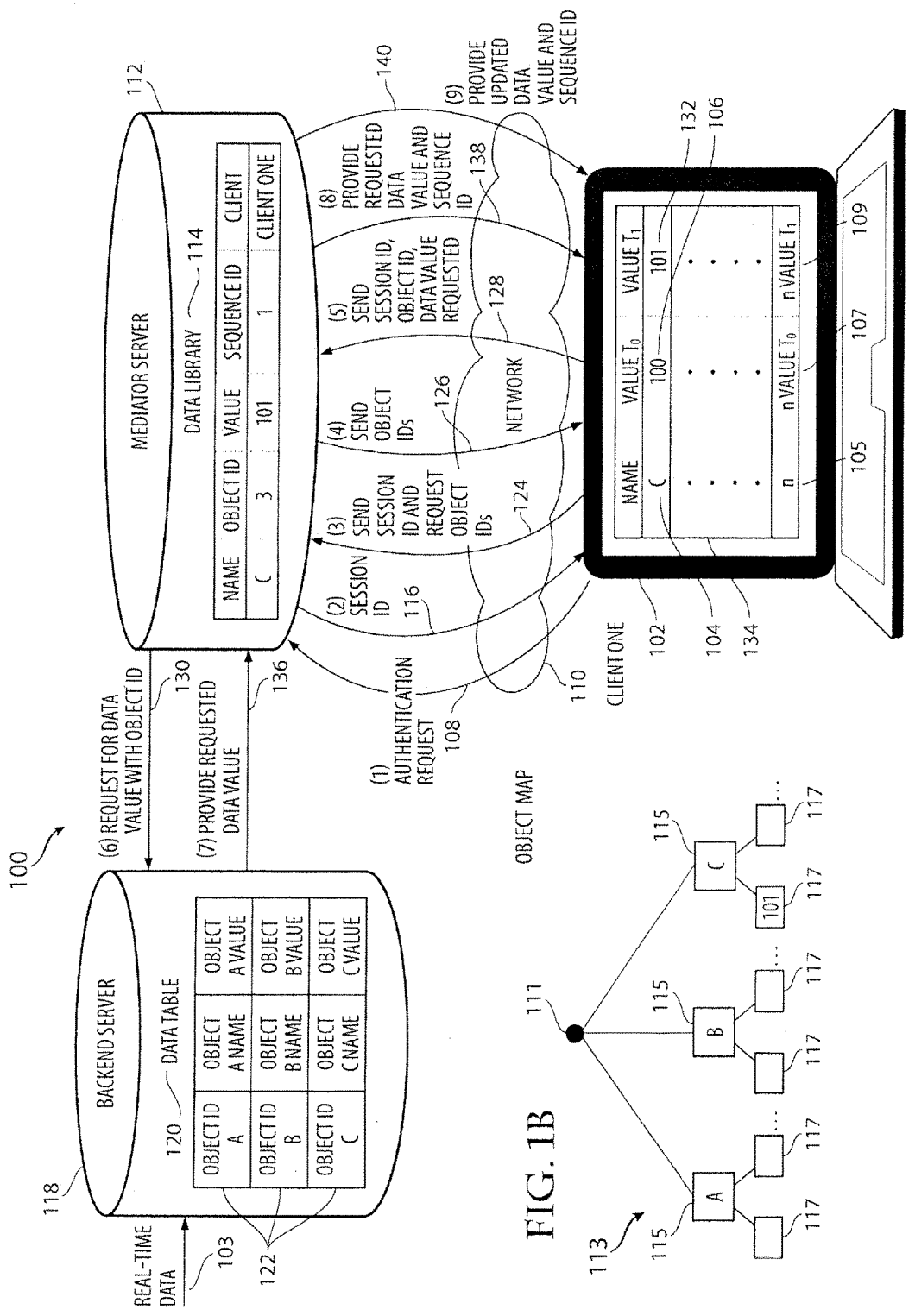

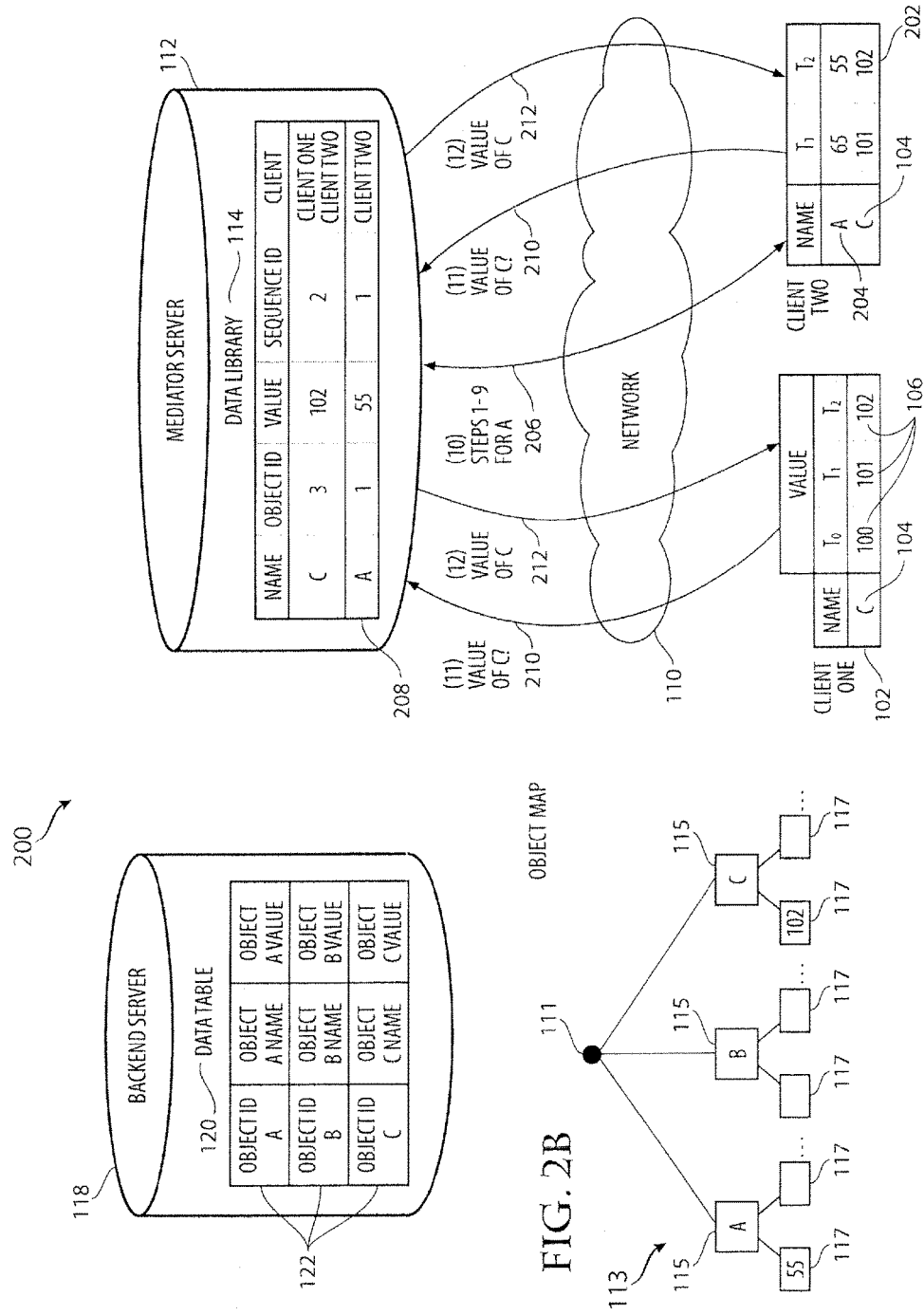

SYSTEM AND METHOD FOR REAL-TIME DATA ACQUISITION AND DISPLAY

BACKGROUND

1. Technical Field

The present disclosure relates to real-time data acquisition and display, specifically improving the acquisition and display of database information, which may be live and frequently changing, by bypassing standard Structured Query Language (SQL) database queries, communicating changes to data values, and updating only those portions of a display affected by the changed data.

2. Introduction

Communications with relational database management systems generally rely on queries which are constructed using SQL. While there are many different SQL database management systems available, the generic query or "select" statement has a common format: SELECT column1_name (column2_name, etc.)+FROM table name. The query is sent to a query language processor, where the query is parsed and optimized, then processed by a database management system engine which reads the parsed and optimized query and actually retrieves the data. However, because each step of the query requires time to process and perform the required actions, the overall data retrieval process is slowed.

SUMMARY

Additional features and advantages of the disclosure will be set forth in the description which follows, and in part will be discernable from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims.

Disclosed are systems, methods, and non-transitory computer-readable storage media for real-time data acquisition and display using a SQL bypass query which is faster and less resource intensive than traditional database query functions. In addition, the disclosed concepts improve updates to the data by communicating only changes in the data to client devices, then modifying a user interface based on the data changes received. Doing so solves a communication problem by reducing the total amount of data being transmitted, thereby reducing bandwidth required (and the actual throughput) while retaining real-time data communications, a problem associated with modern Internet-based communications, and particularly in cases where data may change quickly and where numerous data fields may be of interest. In some cases, this decrease in throughput can also result in faster processing of communications being received, and can be viewed as an alternative to data compression.

Consider the following example of a system configured according to this disclosure, where the system is a server acting as a mediator between a client device and a backend server receiving live data. This mediator server can receive, from the client device, a request for a current value of a specific object. For example, if the client device were concerned with real-time weather data, the client device might make a request to the mediator server requesting (1) the current temperature and (2) the current humidity for New York City. If the client device were concerned with securities values, the client device might make a request to the mediator server requesting a current value of a specific security. Similarly, if the client device were associated with a vehicle request service (such as taxis or UBER), the client device might make a request for a current position of a vehicle or vehicles.

The mediator server identifies a unique object identifier (ID) having a real-time value for the specified object, where the object identifier is stored in memory on a third device (such as a back-end server). The mediator server performs a first in-memory retrieval of the real-time value of the specified object using the object ID. An in-memory retrieval as used herein does not use SQL querying, and therefore also does not require SQL parsing, optimization, and use of a data engine to acquire the data. The mediator server obtains the real-time value from the third device and transmits the value to the client device in response to the request.

The mediator server then performs a second in-memory retrieval of the real-time value of the specified object using the object ID. If the real-time value has changed, the mediator updates the real-time value, such that the mediator server stores the updated, current, real-time value of the data. The mediator server also transmits the updated value of the object to the client device, such that the client device can update the current value of the specified object. In other words, the mediator server can push the updated value of the specified object to the client device in real-time. The client device, upon receiving the updated value of the object, can update only those portions of a graphical user interface (or other display) which are changed. By receiving only the updated value of the object, the processing and display of the data by the client device is improved. For example, by receiving only the updated value of the object, fewer client side resources are required to process the data, data processing proceeds more quickly, less bandwidth is used, and only portions of the user interface corresponding to the updated value of the object need to be updated, among other advantages.

According to one embodiment, an apparatus includes a processor and a non-transitory computer-readable medium storing instructions that, when executed by the processor, cause the processor to perform operations including receiving a request for object identifiers, the request associated with a unique session, sending an object identifier, the object identifier associated with an object from a list of objects each having a corresponding object identifier, receiving a request for data, the request referencing the object identifier and a data value associated with the object, performing an in-memory retrieval for the data value associated with the object identifier, and transmitting the data value.

According to another embodiment, an apparatus includes a processor and a non-transitory computer-readable medium storing instructions that, when executed by the processor, cause the processor to perform operations including transmitting a request for object identifiers, the request associated with a unique session, receiving an object identifier, the object identifier associated with an object from a list of objects each having a corresponding object identifier, transmitting a request for data, the request referencing the object identifier and a data value associated with the object, and receiving the data value associated with the object pushed in realtime when the data value changes.

According to a further embodiment, a method includes receiving, by a processor, a request for object identifiers, the request associated with a unique session, sending, by the processor, an object identifier, the object identifier associated with an object from a list of objects each having a corresponding object identifier, receiving, by the processor, a request for data referencing the object identifier and a data value associated with the object, performing, by the processor, an in-memory retrieval for the data value associated with the object identifier, and transmitting, by the processor, the data value.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

FIGS. 1A and 1B illustrate an example system architecture;

FIGS. 2A and 2B illustrate a second example system architecture;

DETAILED DESCRIPTION

Figure 3A:
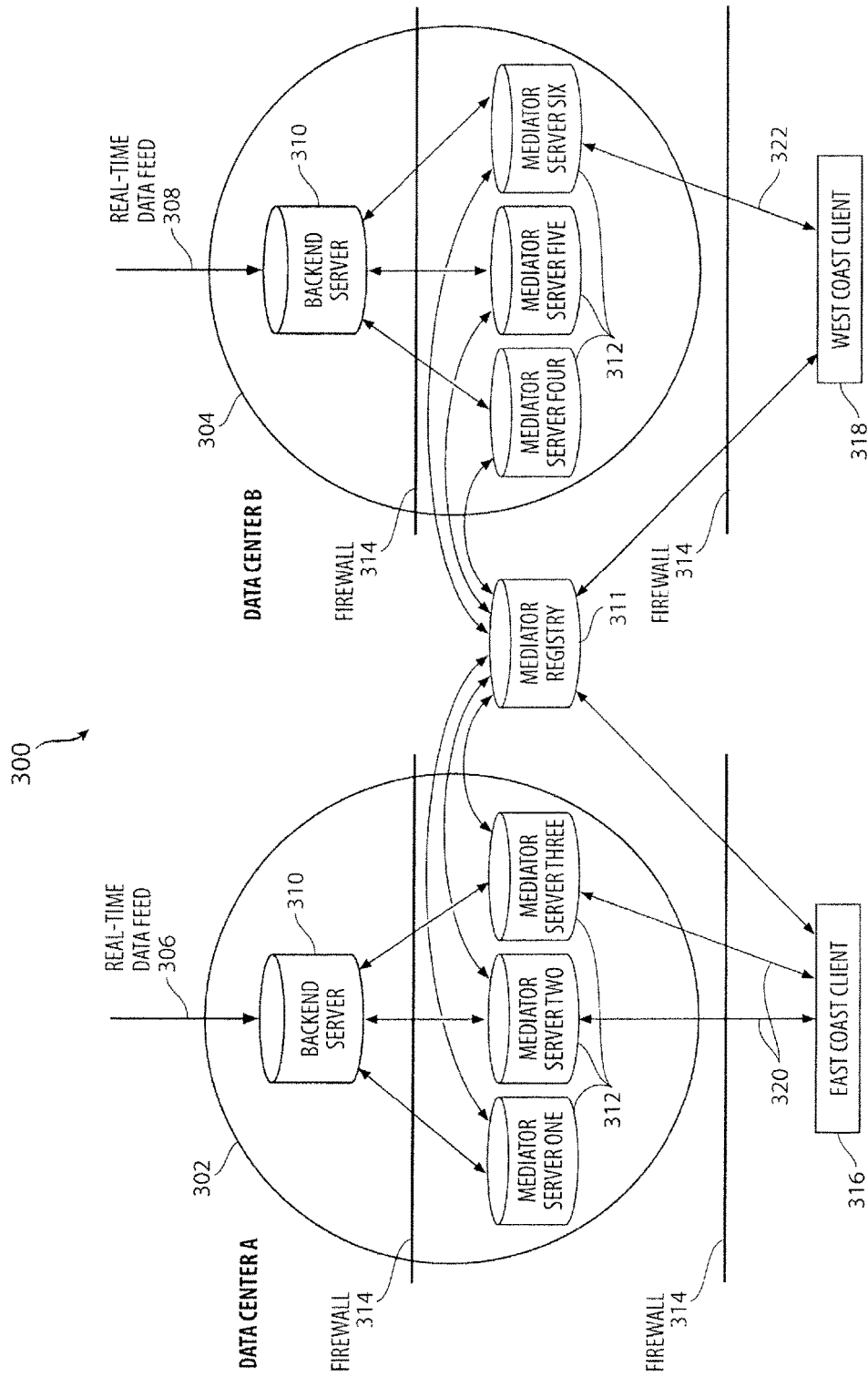
FIGS. 3A, 3B, and 3C illustrate data redundancy between data centers.

A system, method, and computer-readable storage device having computer executable instructions are disclosed which improve acquisition and display of real-time data. Real-time data is often time sensitive and should be sent, or be otherwise available, to clients, systems, and/or devices, in a time, cost, and resource effective manner. Because standard database queries (using the SQL query process described above) are costly in terms of bandwidth, time, and other resources, a SQL query bypass mechanism is described herein which, when placed in the architectures and configurations described, improve the data acquisition/display process.

Various embodiments of the disclosure are described in detail below. While specific implementations are described, it should be understood that this is done for illustration purposes only. Other components and configurations may be used without parting from the spirit and scope of the disclosure.

FIG. 1A illustrates an exemplary system architecture 100 including there are three components: (1) a client device 102, where a user terminal (such as a tablet, laptop, desktop, etc.) or other computing device has instructions to receive and/or display real-time data, (2) a mediator server 112, which receives requests from client device(s) 102 and interacts with a backend server 118 on behalf of the client devices 102 to obtain and provide the real-time data, among other things, and (3) a backend server 118, which receives the real-time data from source resources, and which makes the real-time data available to the mediator server 112 and/or the client device 102. To illustrate one possible method and associated sequence of operations involved in providing real-time data to the client device 102, a sequence of operations (1)-(9) are referenced in the discussion of FIG. 1A. In one embodiment, communications between the devices may be based on a web application programming interface (API), whereby the communication between the client device 102 and the mediator server 112 may be formatted in a particular format. More specifically the communication from the client device 102 to the mediator server 112 may be provided in a particular format such as Javascript Object Notation (JSON), Extensible Markup Language (XML) or another proprietary or open format to a particular uniform resource identifier (URI) to request a particular resource provided by the mediator server 112. The mediator server 112 may provide a response that is expressed as JSON, XML, or in another proprietary or open format.

The client device 102 can have instructions to acquire and/or display real-time data associated with "C" 104 via a graphical user interface (GUI) 134. As non-limiting examples, the operations and concepts discussed herein may be used to allow the client device 102 to present data associated with securities prices, vehicle locations, health information, weather patterns, inventory/warehouse management, etc. As illustrated, the user interface 134 can present the real-time data in a table format, with the user interface 134 illustrating a table of values organized by name (e.g., "C" 104 to "n" 105) and respective values 106, 132, 107, 109. However, additional information display configurations/formats are also contemplated.

The mediator server 112 may instantiate an object map 113 or object tree that is a tree data structure or a similar data structure representing a data library 114 and storing a list of objects, such as a list of instruments including stocks or securities, and their associated data values. This object map 113 may be stored in memory of the mediator server 112 and represents real-time data 103 from the backend server 118. As an example, the object map 113 may have an object map root node 111 and each object may be stored as a tree data structure or a similar data structure having a node 115 and a collection of child/leaf/external nodes 117 associated with the node 115. The object map 113 may have a name "MarketSymbols" that includes data for a stock market. A node 115 may have one child node, a few child nodes, or many child nodes. The node 115 may have a value or field that is associated with the object ID and each child node 117 may have a data value or field such as a current price, volatility, volume, earnings, dividends, next earnings date, a fifty-two week high, a fifty-two week low, etc.

In an exemplary embodiment, the mediator server 112 may provide stock data or another type of data as obtained from the backend server 118 for a list of objects represented by a symbol such as stocks or securities, such as Pear Computer Company (PRR), Moogle (MOOG), Secretsoft (SSFT), and so on. PRR may be assigned an object ID of 1, MOOG may be assigned an object ID of 2, and SSFT may be assigned an object ID of 3, etc. A first client device or consumer may subscribe to updates for PRR and MOOG, a second client device or consumer may subscribe to updates from SSFT and MOOG, and a third client device or consumer may subscribe to updates from SSFT. As noted above, the mediator server 112 may request real-time updates for the data values associated with PRR, MOOG, and SSFT based on the client subscriptions and store the data values in the object map 113. When the data values are updated, the mediator server 112 receives the updated data values from the backend server 118 and stores the updated data values in the object map 113. The mediator server 112 may forward only the updated data values for the objects, e.g., those that have changed, to the first client device, the second client device, and third client device in real-time or near real-time as the updated data values are stored in-memory in the object map 113.

The first client device may request data from the mediator server 112 by sending a request such as "MarketSymbols.PRR" and "MarketSymbols.MOOG." If the first client device requests dividend information, the first client device may send a request such as "MarketSymbols.PRR.Dividends" and "MarketSymbols.MOOG.Dividends." The second client device and the third client device may send similar requests to the mediator server 112.

Each client device may create instantiate or create the object map 113 in memory when the client device first connects to the mediator server 112. Again, the object map 113 may represent the data library 114 and store the list of objects representing the real-time data from the backend server 118. The object map 113 may be populated with data on-demand, when the client device requests data for each object. Thus, each client device may have an object map 113 that stores data based on subscriptions as requested by the client device. For example, the first client device may have the object map 113 with requested data for PRR and MOOG, the second client device may have the object map 113 with requested data for SSFT and MOOG, and the third client device may have the object map 113 with requested data for SSFT. The mediator server 112 may have the object map 113 in memory that stores data for each of PRR, MOOG, and SSFT as requested by the client devices that it serves.

In another example, each client device 102 may have more than one subscription to the same object. The client device 102 may display information associated with the same object in different locations using different visual components of a user interface, and each location may be associated with a different subscription to the object. If there are two visual components associated with a same object, when a first visual component is closed, a second visual component may continue to display data updates. However, if the second visual component is closed, then the client device 102 may no longer receive data updates for the object.

When the object map 113 is first created based on the list of objects, the child nodes 117 may not yet have an associated value, e.g., they may be NULL or another value such as an empty string that indicates that the data value has not been retrieved from the backend server 118. An example of the object map 113 is shown in FIG. 1B including three different nodes 115 each having respective child nodes 117. As shown in FIG. 1B, some of the child nodes 117 do not yet have data values because they have not been requested by clients.

The client device 102 may subscribe to receive updates for information and data associated with the objects. First, the client device 102 is connected to the mediator server 112 through a network, which may be a private network or a public network 110 such as the Internet, and makes an authentication request (operation (1)) 108 to the mediator server 112. The authentication request 108 may include login information such as username information and/or password information for a user making the authentication request. In one example, the username information and/or the password information may be encrypted by the client device 102 before it is transmitted to the mediator server 112. The mediator server 112 may receive the authentication request, confirm that the username information and/or the password information is valid, and send a response to the client device 102.

The response (operation (2)) 116 may include a session identifier (ID) that is unique and references the current communication session between the client device 102 and the mediator server 112. The session ID may be valid for a particular period of time and may be invalidated if the client device ends the current session. After the client device receives the session ID, the client device 102 may send the session ID along with a request for object IDs associated with the list of objects that may be stored in the data library 114 of the mediator server 112 (operation (3)) 124. The mediator server 112 may receive the request for the object IDs and send the object IDs to the client device (operation (4)) 126. Each object ID may correspond with an object in the list of objects.

Next, the client device 102 may subscribe to updates and send a request for information such as a value associated with a particular object "C." As an example, the client device 102 may desire to subscribe to the current stock price of "C." The client device 102 may transmit the session ID and the object ID associated with the particular object to obtain the value of C from the mediator server 112 (operation (5)) 128. The user of the client device 102 may subscribe to receive real-time updates for one or more data values for each particular object ID.

As described herein, before operation (1) and when the mediator server first connects to the backend server 118, the mediator server 112 may create and store in memory the data library 114 represented by the object map 113 containing information about the data being requested by the client device 102. Information within this data library 114 may include a name of the specific object or item number, a current value of the item, and which client devices have requested the value of that specific object. The data library 114 can also include other values and data (such as historical data) associated with the specific object. The data library 114 may also include the object ID (e.g., a specific identifier) which references the object in the data table 120 of a backend server 118, the real-time data for the specified object is stored. When the mediator server 112 does not know the updated value for the specified object being requested by the client device 102, the mediator server 112 requests the value using the object ID of the requested object from the backend server 118. In other configurations, the mediator server 112 can look up the object ID within a separate database or list. Additionally, after operation (4) 126, the client device may create and store the object map 113 based on the list of objects in memory of the client device 102. First, the client device 102 may create an empty data structure that represents the object map 113. When the client device 102 connects to the mediator server 112, the client device may populate the empty data structure with data based on object IDs. Each object ID may be represented by a node 115 and when the client device 102 requests data for a particular object ID, the data may be used to populate child nodes 117 of the associated node 115.

The backend server 118 receives the real-time data 103 from a real-time source or sources, such as a securities exchange computing system or data source, a flight control database, patient information systems, manufacturing and/or distribution databases, etc. The backend server 118 stores the data in a data table 120, where the data table 120 is organized to record the values of the various objects. For example, as illustrated, the data table 120 stores the name for object "A" associated with object ID 1, and the current value of "A" associated with object ID 1. As the backend server 118 receives real-time data for "A" from originating sources, the current value is updated that is associated with object ID 1. Similarly, names, values, and other data for other real-time data being received (such as the names and values for "B" and "C") are associated with specific object IDs within the data table 120, e.g., object ID 2 and object ID 3, respectively. Exemplary originating sources can include, if a system were monitoring changes in securities values, various financial databases, data streams, and the like. If the system were monitoring vital signs of patients in a hospital, the originating source could be a server that receives and processes vital signs from patients in a hospital.

The backend server 118, upon receiving the request 130 for the value or values associated with object ID of the requested object from the mediator server 112 (operation (6)) 130, provides the current value of the requested object, to the mediator server 112 (operation (7)) 136. The mediator server 112 records the current value for the object in the data library 114 along with a current sequence ID that is modified or incremented when the current value changes and communicates the current value of the object (e.g., "C") along with the sequence ID to the client device 102 (operation (8)) 138. As shown in FIG. 2B and discussed herein, the object map 113 and respective nodes are updated with the new data values. The client device 102 then stores, displays, or otherwise processes the current value 106 it has received. For example, if the system is configured to display securities or other financial data, the client device 102 can instruct the user interface 134 to display the current value 106 received. The client device 102 may also need to de-capsulate or otherwise identify the individual pieces of data being received for storage, processing, and/or display.

The initial value 106 received at the client device 102 is represented by the "Value $T_0$" and, in this example, has a value of "100" 106. "Value $T_0$" and "Value $T_1$" are illustrated to show the value associated with specified objects changing on the client device 102. In some configurations, the client device 102 may record a history of values for specified objects, whereas in other configurations the client device 102 may only have a most recent/current value for the object specified. Client devices 102 configured to record the history of values can display changes to the objects over time, calculate percentages of variance in the data over time, identify patterns in the changes, etc. For example, if the client device 102 were configured to receive real-time data about the pricing of securities, the client device 102 can identify trends in the security pricing, trends in the volume being traded, and projections for future trading based on the historical data recorded.

The mediator server 112, after having sent the value of the specified object to the client device 102, continues to check the value of the object as recorded in the backend server 118 using the object ID recorded in the data library 114. The mediator server can, for example, check the object ID for the object multiple times per second to conform with "real-time" standards (e.g., faster than four times per second, or 250 ms). This repeated and continual verification of the data in the backend server does not require additional requests or instructions from the client device 102. When any difference in the value for the object is determined between the value recorded in the data library 114 and the real-time data recorded in the data table 120, the mediator server 112 determines that there is a difference, increments the sequence ID, and updates the value stored in the data library 114. The mediator server 112 then forwards the updated value to the client device 102 along with the current sequence ID (operation (9)) 140 such that the client device 102 can similarly display the updated value of the object.

As an example, if the client device 102 has subscribed to the particular object ID and five of ten data values associated with the particular object ID have changed, the mediator server 112 only forwards the updated data values to the client device 102 for the five of the ten data values associated with the particular object ID. Additionally, the mediator server 112 may transmit the updated data values to the client device 102 in a most efficient manner. As an example, a stock price for the particular object ID may be defined as a decimal value having a size of one hundred and twenty-eight bits. Some stock prices may be transmitted from the mediator server 112 to the client device 102 as a byte (e.g., eight bits) that may be converted by the client device 102 to one hundred and twenty-eight bits.

Benefits of this architecture 100 include faster communication because no query (SQL or otherwise) is needed. Instead of using an engine or other data retrieval mechanisms, the data is obtained directly from where the data is stored within the memory device. In addition, the architecture 100 may only distribute data to the mediator server 112 which has been requested by a client device 102 (a subset of the total data held by the backend server 118), rather than communicate all of the data held by the backend server 118. For example, in a system configured to provide vital signs of patients in a hospital, the client device 102 may be at a nursing station, and may only be requesting to see vital signs for the patients on that floor (rather than the entire hospital). In such an example, the backend server 118 would receive and hold the real-time data for the entire hospital, while only the portion of the data corresponding to the current patients associated with the nursing station would be sent to a particular client device 102. By only communicating a portion of the data, bandwidth is reduced and speed may be increased. Furthermore, the mediator server 112 can be strategically placed geographically to allow for faster communications with the client device 102 and/or provide redundancy in case a mediator server 112 or a backend server 118 is unavailable.

In the illustrated example 100, the original value of object "C" (recorded as Value $T_0$) was "100" 106. The updated value received was "101", so the client device 102 updates the original value "100" to "101" (recorded under Value $T_1$) and increments or updates the sequence ID. This process, of continuously checking for changes and updating the client device 102 when differences are present, can continue until the client device 102 changes specified objects, goes offline, or otherwise no longer is in communication with the mediator server 112. In that case, the associated session ID may be invalidated. While the example of the updated value being "101" is provided as part of a decimal example, the values can likewise be expressed in other formats such as binary, hexadecimal, hash values, etc.

Consider the following example of how the architecture 100 could be used. The backend server 118 could be receiving real-time data associated with vehicle locations for a nationwide delivery company. Within the data table 120, the object names could be the identifications of the individual vehicles and the object values could be the GPS coordinates of the vehicle. A city-level delivery manager could interact with a client device 102 to request the current locations of the delivery vehicles within his or her city. To do so, the client device 102 of the city-level manager requests the value from a regional mediator server 112 which interacts with the national backend server 118. The mediator server 112 records the current GPS locations and the object IDs within the backend server 118 for each vehicle specified, then provides the GPS locations of the delivery vehicles to the client device 102 of the city-level manager. The mediator server 112 continues to ping or otherwise compare the values recorded within its data library 114 to the data table 120 within the backend server. Anytime a difference exists between the mediator server 112 and the backend server 118 (e.g., anytime a delivery vehicle moves and the GPS location changes), the mediator server 112 can identify the difference, update the current value stored in the data library 114, increment the sequence ID, and communicate the updated value and the sequence ID to the client device 102.

As yet another example, the backend server 118 could record health care information (such as vital signs) for patients in a hospital, with each floor/ward of the hospital having a separate mediator server 112 monitoring just the patients on that floor. Nurses' stations could have client devices to monitor particular sets of patients, and doctors could use client devices to continuously monitor patients when making rounds or when away from the hospital. For example, a doctor sitting at home could use a client device to interact with a mediator server in the hospital, where the mediator server is specific to cardiology. The doctor may then access real-time vital signs of patients through the mediator server using the concepts disclosed herein. At the same time, the cardiology nurses can be monitoring all of the patients within the cardiology ward (e.g., patients of other doctors as well as the patients being observed by the doctor just described) using a separate client device. In addition, the client device 102 can issue an alert or other notification if the updated value exceeds the previous value by a certain threshold. For example, if a patient's heartbeat jumps (or drops) by more than 20% over a previous reading, the client device 102 can issue an alert to notify the nurses and/or the doctor that the patient is at risk. Such alerts can be determined and issued based on historical data, moving averages, patterns identified, etc.

FIGS. 2A and 2B illustrate a second example system architecture which is similar to that of FIGS. 1A and 1B, but with the addition of a second client device 202 at (or near to) time $T_1$. The second client device 202 has instructions to obtain real-time data for both "A" 204 and "C" 104. The steps 206 (operation (10)) to obtain a current value for "A" from the backend server 118 by referencing the object ID stored within memory of the mediator server 112 are identical to those described above for object "C", with the only difference being that the value for "A" and subsequent updates are directed to the second client device 202. However, with respect to "C", the mediator server 112 already has a current value stored because of the previous interactions with the first client device 102. The mediator server 112 therefore communicates the current value of "C" 210 (operation (11)) to the first client device 102 and the second client device 202 ("101" the $T_1$ time from FIG. 1A), and subsequently communicates any changes to "A" or "C" 212 (operation (12)) to the first client device 102 and the second client device 202. In this manner, the first client device 102 receives the updated values with respect to "C", and the second client device 202 receives the updated values with respect to both "A" and "C."

To illustrate the changing values, FIG. 2A uses "$T_0$", "$T_1$" and "$T_2$" within the respective client devices 102, 202, in the same manner as described above with respect to FIG. 1A and a single client device. The difference in FIG. 2A is that the second client device 202 had not requested any data at time $T_0$, and therefore only illustrates values received and changed for times $T_1$ and $T_2$. From the mediator server 112 perspective, this provides an advantage because the current value of "C" is already stored in the data library 114 when "C" is requested by the second client device 202. That is, the mediator server 112 already has the respective object ID associated with the real-time data that is stored within data table 120 of the backend server 118. This also reduces the load on the backend server 118, particularly where there could be hundreds or thousands of client devices 102 connecting, disconnecting, requesting information, etc., associated with thousands or millions of objects.

The mediator server 112 has added a new row of information 208 within the data library 114 to reflect the newly requested data for "A" from the second client device. The mediator server 112 also records information identifying which clients have requested the values. In the illustrated example, the mediator server has recorded that the first client device 102 should receive only information regarding "C" and the second client device 202 should receive information regarding both "A" and "C."

Consider the following example of how the architecture 200 could be used. A first client device 102 is already monitoring a security value "C" using the system as described above with respect to FIG. 1A, and is receiving real-time updates every time the trade value of "C" changes on an exchange. A second client device 202 also requests, through the network 110 and from the mediator server 112, the latest trade value of "C". Because the mediator server 112 already has the current value of "C" recorded in the data library, the mediator server 112 can communicate the real-time trade value of "C" to the second client device 202, along with any subsequent updates to "C." The second client device 202, in addition to requesting trade values of "C", also requests real-time trade values of "A", and therefore the mediator server 112 obtains trade values for "A" from the back-end server 118. The mediator server 112 records the current value of "A" in the data library 114, updates an associated sequence ID, and communicates changes to "A" to the second client device 202. For example, if the security price of "A" increases $0.01, the mediator server can send the updated security price and the sequence ID, to the second client device 202. The mediator server could send updated information: a change in value, the sequence ID, as well as an indication if the value is increasing or decreasing. Similarly, if the security price of "A" were to decrease $0.05, the mediator server could send an updated security price and the sequence ID to the second client device 202 as the updated information, to indicate the decrease in value. If the data does not change, e.g., "A" stays at the same value, no difference is communicated. In addition, when a change is for information or data for one child node of an object, only the change for that particular child node is communicated. Other information or data associated with other child nodes other than the changed information need not be communicated. Because only the updated information associated with child nodes is being communicated rather than the object, the bandwidth needed to transmit the change is reduced, improving communication speed and processing.

Stated another way, queries from multiple users are accumulated and stored in a library on the mediator server 112 and shared with the backend server 118. The backend server 118 uses the queries to determine what subset of the real-time data is being requested and performs a query on the relevant subset of data rather than the entire data set. This allows the system to bypass queries of the entire data set (e.g., all data values being received by the real-time feed) when only a subset of the data is being requested by the users. That is, by using the object ID for the backend server data table 120, no engine is required to look up where a particular value is being stored on the backend server 118, and therefore no search of the entire data set has occurred. When a user wants to query additional data, those queries are added to the user's library and included as part of the processing bypass. Once the processing bypass completes the queries, the data is pushed to the users. Consider the following scenario. For a single object being watched by a client device, a change is identified in an object, whereby a particular value associated with the object changes from "1999.02" to "1999.03". By transmitting only the particular value that changed rather than the entire object, the amount of data actually transmitted (the throughput) is reduced.

For the mediator servers, an object is only placed in the data library 114 when a client device 102, 202 has requested the object. In this manner the objects are session based and associated with session IDs as described herein. When the mediator server 112 identifies that none of the client devices with which it is connected have requested information associated with an object, associated data values may be removed from the data library 114 thereby preventing the mediator server 112 from communicating an outdated value to the next client device. In this case, a particular object ID is no longer requested by any subscribing client devices. Rather than removing the object from the data library 114, the mediator server 112 can retain the object ID.

Retaining an outdated value of the object within the mediator server 112 can also be used for predictive purposes. For example, if historically a client selects object "a", the mediator server 112 can retain the object's object ID until a frequency of use drops below a threshold, or until a threshold amount of time has passed. Alternatively, if object "b" is frequently selected when object "a" is selected, the mediator server may retain the object ID for "b", despite not being requested by a client device, due to a current request for object "a." In yet another example, determinations on which values (and object IDs) to retain in the mediator server 112 can be based on market data. In such a configuration, the mediator server could, for example, retain the object IDs for the top five hundred securities based on trading volume.

Figure 3B:
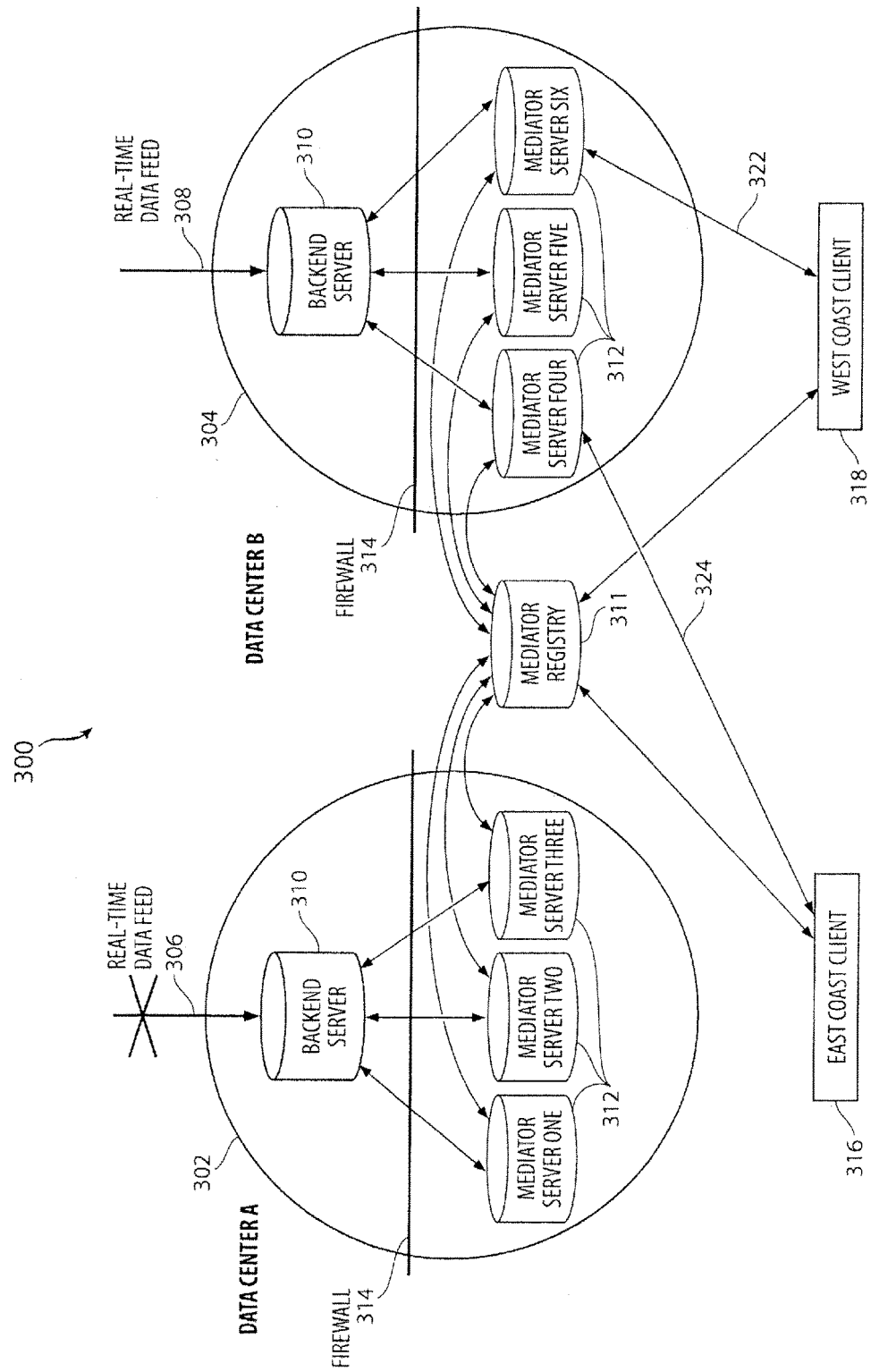

FIGS. 3A and 3B illustrate data redundancy between data centers 300. In FIG. 3A, two separate data centers, Data Center A 302 and Data Center B 304 are established. The data centers 302, 304 illustrated can be physical data centers, where the servers (both backend servers 310 and mediator servers 312) are geographically co-located within a physical building, campus, etc. Alternatively, the data centers 302, 304 can represent virtual data centers, where the backend servers 310 are not co-located with the mediator servers 312. Each data center 302, 304 receives, at a backend server 310, a real-time data feed 306, 308. Within the respective data centers 302, 304, a firewall 314 separates the backend servers 302, 304 from mediator servers 312. The mediator servers 312 in turn communicate 320, 322 with client devices 316, 318. The particular data center 302, 304, and the particular mediator servers 312, that are communicating with a client can, for example, be based on one or more of bandwidth, geography, processing capacity, response times, etc. This can provide load balancing among the respective data centers 302, 304. For example, as illustrated, an east coast client 316 is communicating 320 with mediator servers 312 located in Data Center A 302, whereas a west coast Client 318 is communicating 322 with mediator servers 312 located in Data Center B 304.

A mediator registry 311 may log information associated with each of the mediator servers 312 including availability of each of the mediator servers 312, health information for each of the mediator servers 312, load information for each of the mediator servers 312, and other information for each of the mediator servers 312. Before a client device 316, 318 communicates with a mediator server 312, the client device may send a request to the mediator registry 311 to have the mediatory registry determine and identify the most appropriate or best mediator server for the client device based on the availability, health information, load information, bandwidth, geography, processing capacity, response time, and other information.

FIG. 3B illustrates the redundancy available by the disclosed architecture described in FIGS. 1 and 2. Specifically, when the real-time data feed 306 is broken, the east coast client 316 shifts communications 324 to the mediator servers 312 located within Data Center B 304. Such a shift can require initial data and object ID requests 108, 116, as well as storing the object IDs for east coast client 316 objects from the Data Center B 304 backend server 310. After the east coast client 316 receives the current values from Data Center B 304, only the updated data values need to be communicated.

In certain configurations, when the data feed 306 fails and a client device switches data centers with an active data feed 308, the mediator server 312 can then begin communicating updated values to the client device 316. Hence, besides load balancing, the system may also provide an efficient failover system, where client devices can switch between data centers when failure occurs with limited downtime.

Figure 3C:
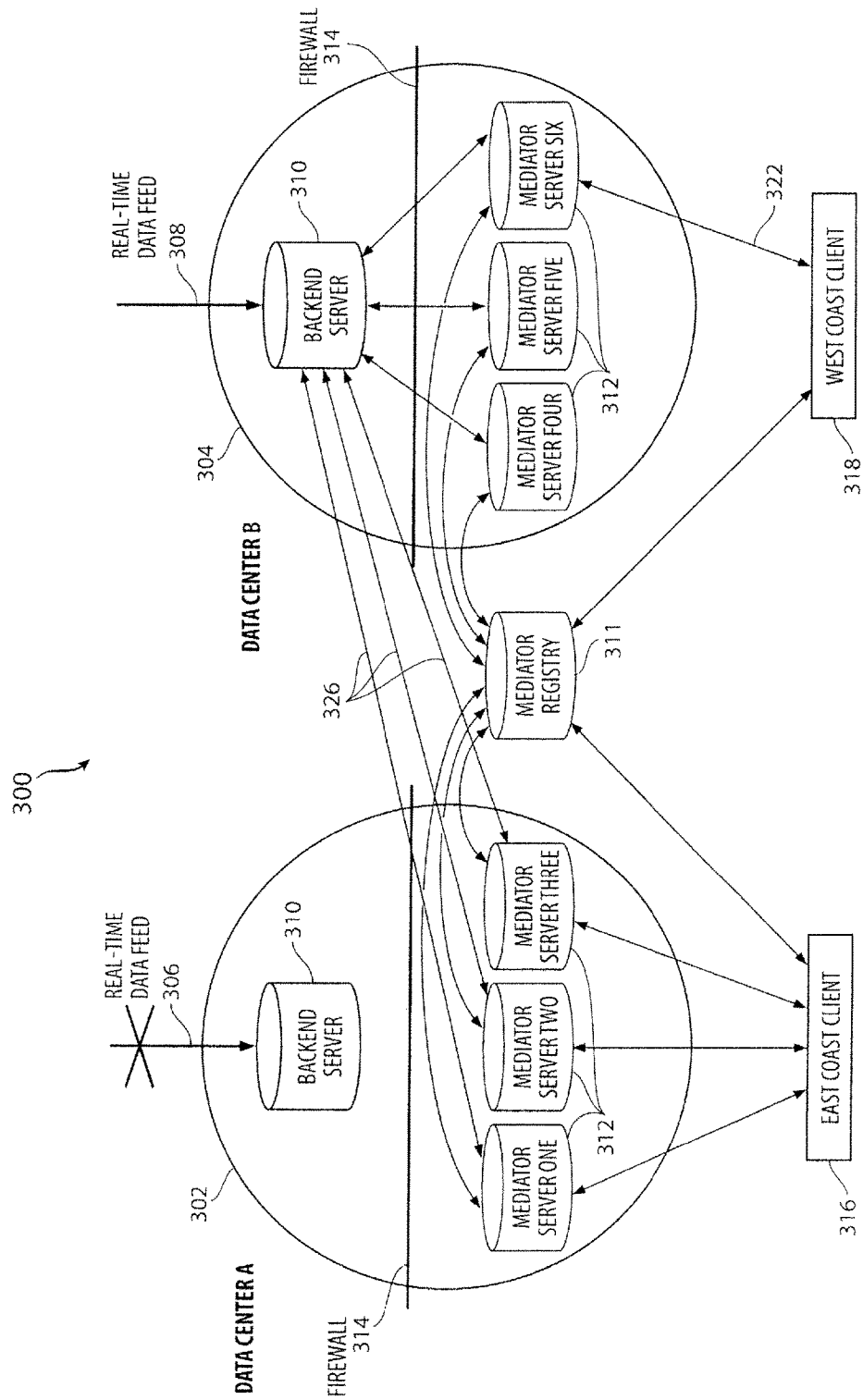

FIG. 3C illustrates another alternative provided by the disclosed architecture shown in FIGS. 1 and 2. As an example, the east coast client 316 may be connected to the mediator servers 312 associated with Data Center A 302. In this case, the mediator servers 312 in Data Center A 302 may be connected 326 to the backend server 310 in Data Center B. This may be useful when the backend server 310 in Data Center A is under maintenance and allow the mediators in Data Center A 302 to continue to serve the east coast Client 316.

Figure 4:
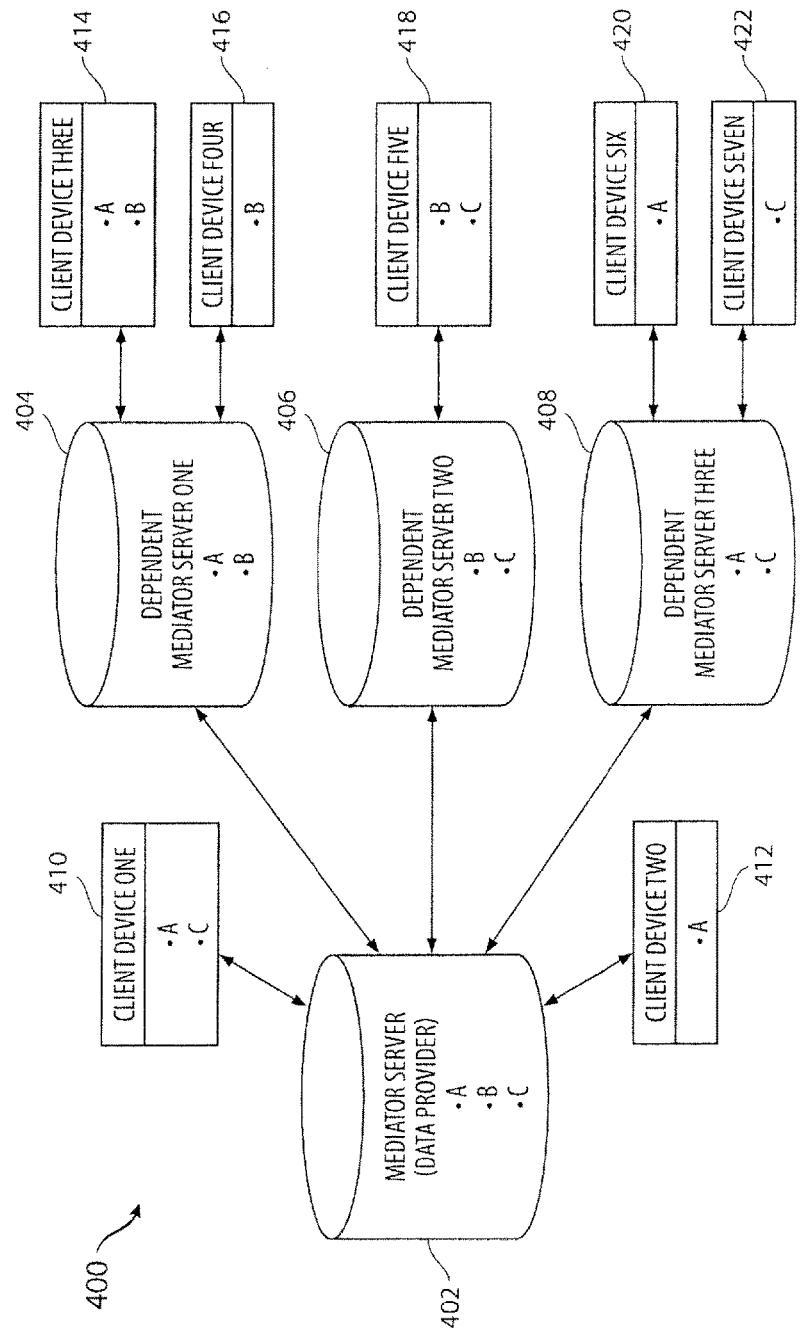
FIG. 4 illustrates a third example system architecture.

FIG. 4 illustrates a third example system architecture 400. Specifically, FIG. 4 illustrates that mediator servers can form a tiered, layered, and/or distributed architecture 400, where each mediator server 402-408 can respectively store data specific to the client devices (or other intermediate/mediator servers) with which each mediator server is communicating. Thus, as illustrated, a command mediator server 402 serves as the data provider to dependent mediator servers 404-408. Because the command mediator server 402 feeds data to the dependent mediator servers 404, the command mediator server 402 stores all of the object IDs ("A", "B", and "C") being accessed by the dependent mediator servers 404-408. The dependent mediator servers 404-408 can record the object IDs in the top mediator server 402 for the respective objects, in the same manner described above (where the mediator server 112 records object IDs having associated objects with object values stored in the backend server 118). Accordingly, the dependent mediator servers 404-408 can use object IDs to obtain the most recent data obtained by the command mediator server 402. Such a configuration has an advantage by distributing servers that contain particular instances of data and data values, which in turn can lead to an improved distribution of bandwidth, ports, switches, etc. At the same time, communication through tiers of computing devices can result in delays in processing and presenting the data.

Each mediator server 402-408 (including the top mediator server 402) can have client devices with which it is communicating. For example, mediator server 402 can have devices 410, 412, while the dependent mediator servers 404-408 can be in communication with additional client devices 414-422. The data being stored in the data libraries of each respective mediator server 402-408 is based on what data those devices "dependent from" the mediator server are requesting. For example, dependent mediator server 408 stores data associated with objects "A" and "C" because client devices 420, 422 respectively request data about "A" and "C." Likewise, the top mediator server 402 stores data about "A", "B", and "C" despite client devices 410, 412 requesting data concerning "A" and "C" because dependent mediator servers 404, 406 request data concerning "B."

Figure 5:
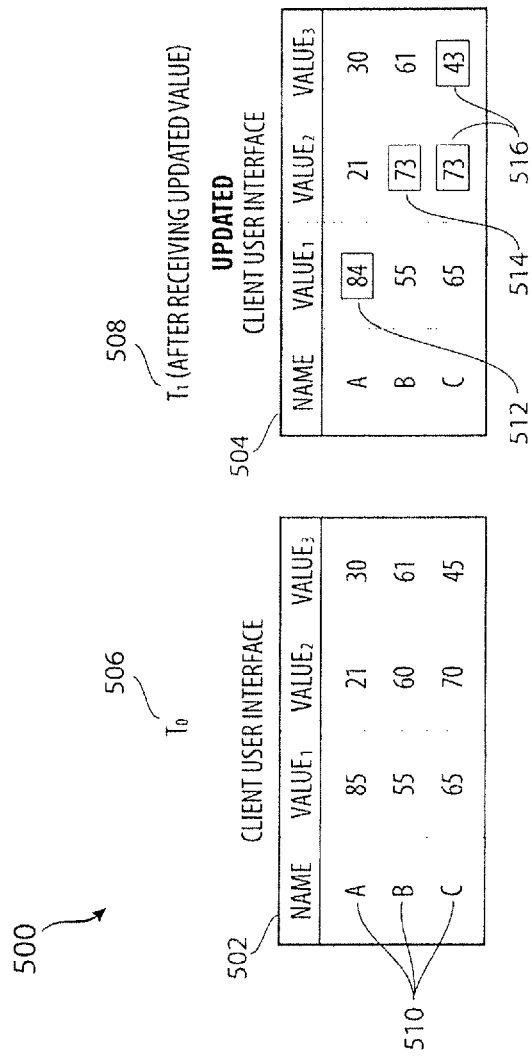
FIG. 5 illustrates a user interface being updated.

FIG. 5 illustrates a user interface with data fields that may be efficiently updated, which may function to the advantage of the architectures described above. For example, FIG. 5 illustrates a user interface 502 with objects and values displayed at $T_0$ 506 for "A", "B", and "C." In this case, each object has multiple values associated with it, and therefore the user interface 502 is arranged in columns and rows. As updated data is received (and the time changes to $T_1$ 508), only the updated data will be redrawn on the user interface. This redrawing results in an updated client user interface 504. In this case, the communication received updated values for distinct portions of "A," "B," and "C". The system therefore redraws those portions 512, 514, 516 of the user interface corresponding to the changes while leaving the remaining portions as they were presented in the "original" client user interface 506. Modifying a client user interface 502 in the disclosed manner, to yield an updated client user interface 504, can save on processing power and display the updated data faster, providing an improvement to the computer-systems themselves.

Figure 6A:
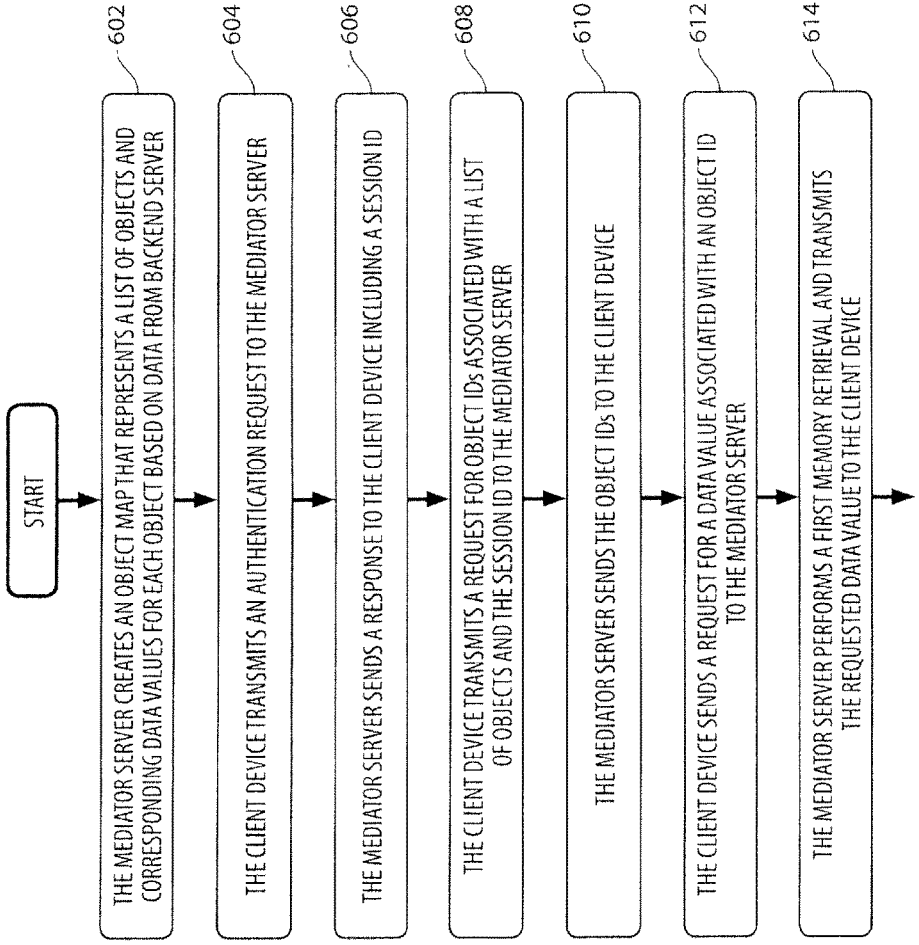
FIGS. 6A and 6B illustrate an example method embodiment.

Having disclosed exemplary system architectures components and concepts, the disclosure now turns to the exemplary method embodiment 600 shown in FIG. 6A. For the sake of clarity, the method is described in terms of an exemplary system mediator server 112 as illustrated in FIGS. 1 and 2. However, the steps outlined herein are exemplary and can be implemented in any combination thereof, including combinations that exclude, add, or modify certain steps.

In 602, the mediator server 112 creates an object map in memory that represents a list of objects and corresponding data values for each of the objects based on data received from the backend server 118.

In 604, the client device 102 transmits an authentication request to the mediator server 112. In 606, the mediator server 112 receives the authentication request and verifies any authentication information such as username information and/or password information. The mediator server 112 sends a response to the client device 102 including a session ID for the current session. The client device 102 receives the session ID.

In 608, the client device 102 transmits a request for object IDs associated with the list of objects and includes the session ID with the request for information. In 610, if the session ID is valid, the mediator server 112 sends the object IDs for each of the available objects to the client device.

In 612, the client device 102 may subscribe to updates for a subset of the list of objects and may send a request for data values of the subset of the list of objects. In one example, the client device 102 may send the object ID and references to particular data values associated with each object that is included in the subscription. As an example, the request may be one (two, three), indicating that the client device is requesting data values two and three associated with the object having the object ID of one. The mediator server may parse the request to determine that the request is for a particular stock having a name, a current price, and a percentage change for the current day. If the mediator server 112 does not have the requested data value in memory, the mediator server requests the data value from the backend server 118 and stores the data value in the object map.

Figure 6B:
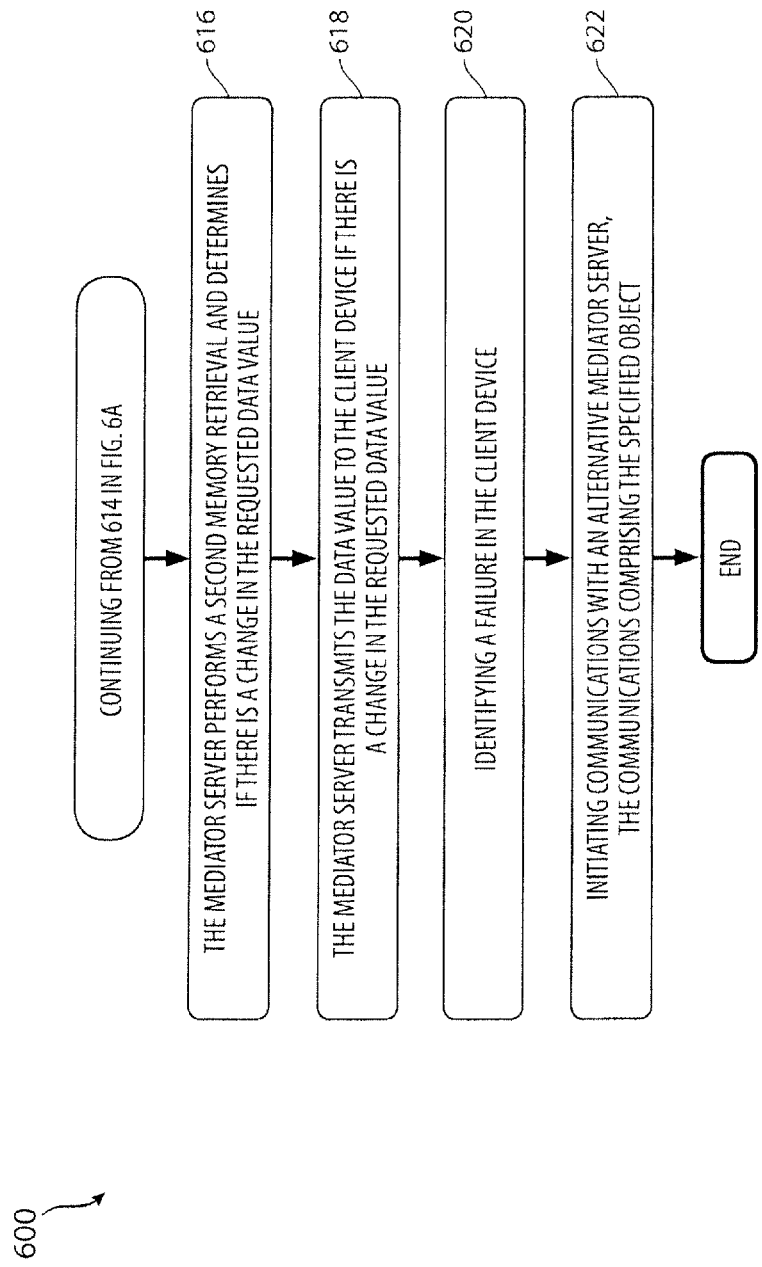

The method continues in FIG. 6B. In 614, the mediator server 112 performs a first in-memory retrieval based on the request to obtain the requested data values associated with the object, and transmits the requested data values to the client device 102. The mediator server 112 continually requests the data value from the backend server 118 and stores the data value in the object map. In 616, the mediator server performs a second in-memory retrieval based on the request to obtain the requested data values associated with the object. The mediator server 112 determines if there is a change in one or more of the requested data values. If there is a change in one or more of the requested data values, in 618, the mediator server 102 transmits only the changed data values to the client device 102.

FIG. 6B further illustrates the method 600 continuing from transmission of the updated data value to the client device (618) by the mediator server 112 identifying a failure in the first device (620) and initiating communications with an alternative mediator server, the communications comprising the specified object (622).

In another configuration, when a new, second client device is being added, the mediator server 112 can receive, from the first client device and from the second client device, a second request for the current value of the specified object. The system 112 can then transmit the captured value to the second client device in response to the second request, and also transmit any updates to the data value to the second client device when an update is identified in real-time.

The system 112 can also work in conjunction with a graphical user interface. For example, the client device can display the captured value in a graphical user interface and, upon receiving the updated value, update only a portion of the graphical user interface corresponding to the specified object. In other words, only that portion of the display corresponding to changed object values (such as when a vehicle moves position, the status of a medical patient changes, a difference in security price is detected, etc.) would be redrawn.

In some configurations, the mediator server 112 can maintain a list of objects for which client devices have requested real-time data.

The method being practiced by the mediator server 112 can further identify, within the backend server 118, a data storage module in a plurality of data storage modules having a fastest communication rate with a processor of the third device and store the object ID having an object and associated values stored in the data storage module. The real-time value of the specified object associated with the object ID can then be read from the data storage module as part of the first in-memory capture and the second in-memory capture.

Depending on specific configurations, a firewall can exist between the client device 102 and the mediator server 112, between the mediator server 112 and the backend server 118, and the client device 102 can communicate with the mediator server 112 via the network 110. In addition, identifying the object ID associated with an object and associated values stored on the backend server 118 can include accessing a database of object IDs on the backend server 118 for a plurality of objects. Finally, it should be noted that the in-memory captures of information are queries which perform a SQL bypass, and are not SQL requests.

Figure 7:
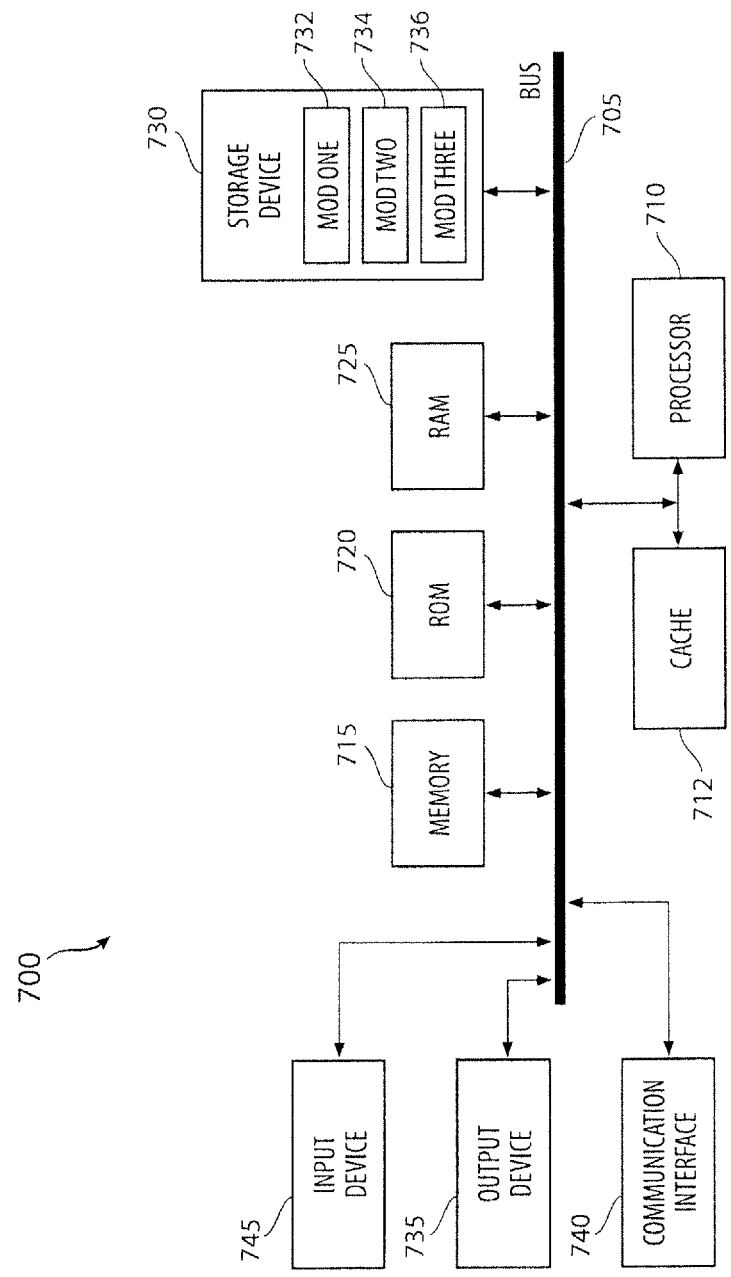
FIG. 7 illustrates an exemplary computer architecture.

Having discussed a system configured to perform the concepts and principles disclosed herein, the disclosure turns to a description of a computing system which can be employed by any of the devices referenced herein. More specifically, the concepts and principles disclosed with reference to FIG. 7 can be used in the backend server 118, the mediator server 112, or the client device 102. With reference to FIG. 7, an exemplary system 700 includes a computing device 700, including a processing unit (CPU or processor) 710 and a system bus 705 that couples various system components including the system memory 715 such as read only memory (ROM) 720 and random access memory (RAM) 725 to the processor 710. In the case of a client device 102, the memory components 715, 720, 725 can include instructions for the processor 710 indicating what objects to request from the mediator server 112. In the case of a mediator server 112, the memory components 715, 720, 725 can include communication information for communicating with any client devices 102, the data library 114 and the object map 113 (including object IDs for objects stored in a database or memory on a backend server 118), and instructions for how to pull data from the backend server 118 and push the changes to the objects to the registered client devices 102. The system 700 can include a cache 712 of high speed memory connected directly with, in close proximity to, or integrated as part of the processor 710. The system 700 copies data from the memory 715 and/or the storage device 730 to the cache 712 for quick access by the processor 710. In some cases, the addresses for specific objects being requested by the client device 102 can be stored in the cache 712, allowing for faster access to the data on the backend server 118. In this way, the cache provides a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. It can be appreciated that the disclosure may operate on a computing device 700 with more than one processor 710 or on a group or cluster of computing devices networked together to provide greater processing capability. The processor 710 can include any one or more processors and a hardware module or software module, such as a first module 732, a second module 734, and a third module 736 stored in storage device 730, configured to control the processor 710 as well as a special-purpose processor where software instructions are incorporated into the actual processor design. Instructions can include how to receive data, decapsulate the data, forward the decapsulated data to proper storage/display locations, how to request data, and/or perform analyses on the data. The processor 710 may essentially be a completely self-contained computing system, containing multiple cores or processors, a bus, memory controller, cache, etc. A multi-core processor may be symmetric or asymmetric.

The system bus 705 may be any of several types of bus structures including a memory bus or memory controller, a peripheral bus, and a local bus using any of a variety of bus architectures. A basic input/output (BIOS) stored in ROM 720 or the like, may provide the basic routine that helps to transfer information between elements within the computing device 700, such as during start-up. The computing device 700 further includes storage devices 730 such as a hard disk drive, a magnetic disk drive, an optical disk drive, tape drive or the like. The storage device 730 can include software modules 732, 734, 736 to control the processor 710. Other hardware or software modules are contemplated. The storage device 730 is connected to the system bus 705 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 710, bus 705, and so forth, to carry out the function. In another aspect, the system can use a processor and computer-readable storage medium to store instructions which, when executed by the processor, cause the processor to perform a method or other specific actions such as those methods and functions described herein. The basic components and appropriate variations are contemplated depending on the type of device, such as whether the device 700 is a small, handheld computing device, a desktop computer, or a computer server.

Although the exemplary embodiment described herein employs the hard disk 730, other types of computer-readable media which can store data that are accessible by a computer, such as magnetic cassettes, flash memory cards, digital versatile disks, cartridges, random access memories (RAMs) 725, and read only memory (ROM) 720, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 745 represents any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems enable a user to provide multiple types of input to communicate with the computing device 700. The communications interface 740 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 710. The functions these blocks represent may be provided through the use of either shared or dedicated hardware, including, but not limited to, hardware capable of executing software and hardware, such as a processor 710, that is purpose-built to operate as an equivalent to software executing on a processor. For example the functions of one or more processors presented in FIG. 7 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 720 for storing software performing the operations described below, and random access memory (RAM) 725 for storing results. Very large scale integration (VLSI) hardware embodiments, as well as custom VLSI circuitry in combination with a DSP circuit, may also be provided.

The logical operations of the various embodiments are implemented as: (1) a sequence of computer implemented steps, operations, or procedures running on a programmable circuit within a computing device, (2) a sequence of computer implemented steps, operations, or procedures running on a specific-use programmable circuit; and/or (3) interconnected machine modules or program engines within the programmable circuits. The system 700 shown in FIG. 7 can practice all or part of the recited methods, can be a part of the recited systems, and/or can operate according to instructions in the recited tangible computer-readable storage media. Such logical operations can be implemented as modules configured to control the processor 710 to perform particular functions according to the programming of the module. For example, FIG. 7 illustrates three modules 732, 734, and 736 which are modules configured to control the processor 710. These modules may be stored on the storage device 730 and loaded into RAM 725 or memory 715 at runtime or may be stored in other computer-readable memory locations.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to any database query systems, such as crowd-sourcing solutions (i.e., UBER, AIRBNB), security price monitoring, and health-care (i.e., real-time vital signs of patients) related data. Various modifications and changes may be made to the principles described herein without following the example embodiments and applications illustrated and described herein, and without departing from the spirit and scope of the disclosure.

We claim:

1. An apparatus comprising:
   a processor; and
   a non-transitory computer-readable medium storing instructions that, when executed by the processor, cause the processor to perform operations comprising:
      receiving a request for object identifiers, the request associated with a unique session;
      sending an object identifier, the object identifier associated with an object from a list of objects each having a corresponding object identifier;
      receiving a request for data, the request referencing the object identifier and a data value associated with the object;
      performing an in-memory retrieval for the data value associated with the object identifier;
      transmitting the data value;
      creating an object map having a tree structure that represents the list of objects and the data value associated with each object; and
      storing the object map in memory.

2. The apparatus of claim 1, wherein the in-memory retrieval is a first in-memory retrieval, the operations further comprising performing a second in-memory retrieval for the data value associated with the object identifier, determining that the data value has changed since the first in-memory retrieval, incrementing a sequence identifier, and transmitting the changed data value.

3. The apparatus of claim 2, the operations further comprising receiving the sequence identifier, determining that the sequence identifier is different indicating that the data value associated with the object has changed, and transmitting the changed data value.

4. The apparatus of claim 1, the operations further comprising sending a request for data, the request referencing the object identifier and the data value associated with the object to a server, receiving an updated data value associated with the object from the server, and storing the updated data value in the object map.

5. The apparatus of claim 1, the object map comprising a node for each object of the list of objects, each node identified by the corresponding object identifier and each node having a child node that stores the data value associated with the object.

6. The apparatus of claim 1, the operations further comprising displaying the data value on a graphical user interface (GUI) and modifying the data value in real-time upon receipt of an update to the data value.

7. The apparatus of claim 1, the operations further comprising:
   transmitting an authentication request; and
   receiving a response to the authentication request, the response comprising a session identifier referencing the unique session.

8. The apparatus of claim 1, the operations further comprising:
   transmitting a communication to a registry; and receiving a response to the communication, the communication indicating a server for responding to the request for data, the server selected by the registry based on server availability, server health information, and server load information.

9. A method comprising:

receiving, by a processor, a request for object identifiers, the request associated with a unique session;

sending, by the processor, an object identifier, the object identifier associated with an object from a list of objects each having a corresponding object identifier;

receiving, by the processor, a request for data referencing the object identifier and a data value associated with the object;

performing, by the processor, an in-memory retrieval for the data value associated with the object identifier;

transmitting, by the processor, the data value;

creating an object map having a tree structure that represents the list of objects and the data value associated with each object; and storing the object map in memory.

10. The method of claim 9, further comprising sending a request for data, the request referencing the object identifier and the data value associated with the object to a server, receiving an updated data value associated with the object from the server, and storing the updated data value in the object map.

11. The method of claim 9, the object map comprising a node for each object of the list of objects, each node identified by the corresponding object identifier and each node having a child node that stores the data value associated with the object.

12. The method of claim 9, further comprising parsing the request for data to determine the object identifier and the data value associated with the object.

13. The method of claim 9, further comprising parsing the request for data, the request for data comprising a hashed representation of the object identifier and the data value associated with the object.

14. The method of claim 9, wherein the request for data referencing the object identifier and the data value associated with the object is received from a first client device, the method further comprising:

receiving a request for data from a second client device, the request for data referencing the object identifier and the data value associated with the object;

performing an in-memory retrieval for the data value associated with the object; and transmitting the data value to the second client device.

15. The method of claim 9, further comprising:

receiving an authentication request; and sending a response to the authentication request, the response comprising a session identifier referencing the unique session.

16. A method comprising:

receiving, by a processor, a request for object identifiers, the request associated with a unique session;

sending, by the processor, an object identifier, the object identifier associated with an object from a list of objects each having a corresponding object identifier;

receiving, by the processor, a request for data referencing the object identifier and a data value associated with the object;

performing, by the processor, an in-memory retrieval for the data value associated with the object identifier, wherein the in-memory retrieval is a first in-memory retrieval;

transmitting, by the processor, the data value; and performing a second in-memory retrieval for the data value associated with the object identifier, determining that the data value has changed since the first in-memory retrieval, incrementing a sequence identifier, and transmitting the changed data value.

17. The method of claim 16, further comprising receiving the sequence identifier, determining that the sequence identifier is different indicating that the data value has changed, and transmitting the changed data value.

* * * * *